United States Patent
Ladha

(10) Patent No.: US 8,159,531 B2
(45) Date of Patent: Apr. 17, 2012

(54) CONTROLLING OPERATIONS IN AN IMAGE FORMATION PROCESS IN CONFOCAL MICROSCOPE

(75) Inventor: Shab Ladha, Giles (GB)

(73) Assignee: PerkinElmer Singapore Pte Ltd., Singapore (SG)

( * ) Notice: Subject to any disclaimer, the term of this patent is extended or adjusted under 35 U.S.C. 154(b) by 1300 days.

(21) Appl. No.: 11/547,870

(22) PCT Filed: Apr. 22, 2005

(86) PCT No.: PCT/GB2005/001558
§ 371 (c)(1),
(2), (4) Date: May 25, 2007

(87) PCT Pub. No.: WO2006/106561
PCT Pub. Date: Nov. 10, 2005

(65) Prior Publication Data
US 2007/0291111 A1    Dec. 20, 2007

(30) Foreign Application Priority Data

Apr. 28, 2004   (GB) .................................. 0409411.6
Dec. 17, 2004   (GB) .................................. 0427651.5

(51) Int. Cl.
*H04N 9/47* (2006.01)
(52) U.S. Cl. ............... 348/79; 348/80; 348/42; 348/47; 358/475; 358/471; 358/474; 359/383; 359/388; 359/368; 359/385; 359/371
(58) Field of Classification Search ........... 348/79, 348/80, 42, 47
See application file for complete search history.

(56) References Cited

U.S. PATENT DOCUMENTS

| | | | |
|---|---|---|---|
| 4,618,254 A | 10/1986 | Thearien | |
| 5,276,325 A | 1/1994 | Todokoro | |
| 6,191,885 B1 | 2/2001 | Kitagawa | |
| 6,426,835 B1 * | 7/2002 | Endo et al. | 359/388 |
| 6,724,419 B1 | 4/2004 | Green et al. | |
| 6,778,323 B2 * | 8/2004 | Endo et al. | 359/383 |
| 7,388,598 B2 * | 6/2008 | Lee et al. | 348/42 |
| 2002/0097490 A1 | 7/2002 | Endo | |

(Continued)

FOREIGN PATENT DOCUMENTS

EP    0913682 A1    5/1999

(Continued)

OTHER PUBLICATIONS

Uk Search and Examination Report for GB0427651.5; dated Feb. 4, 2005.

(Continued)

*Primary Examiner* — Jude Jean Gilles
(74) *Attorney, Agent, or Firm* — Barnes & Thornburg LLP

(57) ABSTRACT

Apparatus and methods are provided which allow the rapid collection of image data in situations where ancillary equipment must be controlled and co-ordinated as part of an image formation process, such as confocal microscopy for example. The apparatus includes control means (20') for co-ordinating the operation of the apparatus, and operable to receive a first trigger signal (33, 33', 37) indicating the completion of an operation from one component and transmit a second trigger signal (27, 27') to start an operation by another component in response to the first trigger signal. Such a configuration is operate to reduce delays encountered in operation of the apparatus.

8 Claims, 13 Drawing Sheets

U.S. PATENT DOCUMENTS

| | | |
|---|---|---|
| 2003/0147133 A1 | 8/2003 | Engelhardt |
| 2007/0035855 A1* | 2/2007 | Dickensheets ................ 359/819 |

FOREIGN PATENT DOCUMENTS

| | | |
|---|---|---|
| JP | 60170380 A | 9/1985 |
| JP | 8223460 A | 8/1996 |
| JP | 2000/258690 A | 9/2000 |
| JP | 2001/201691 A | 1/2001 |
| JP | 2002010143 A | 1/2002 |
| KR | 10/0277395 A | 2/2001 |
| WO | WO-2004/036892 A2 | 4/2004 |
| WO | WO-2004/036898 A2 | 4/2004 |

OTHER PUBLICATIONS

Examination Report in EP05737910.1; dated Feb. 12, 2007.
Office Action in KR10-2006-7024945; dated Dec. 2, 2011.
Second UK Examination Report for GB0427651.5; dated Apr. 27, 2006.

* cited by examiner

CONTROLLING OPERATIONS IN AN IMAGE FORMATION PROCESS IN CONFOCAL MICROSCOPE

FIELD OF INVENTION

This invention concerns apparatus and methods which allow the rapid collection of image data in situations where ancillary equipment must be controlled and co-ordinated as part of an image formation process, such as confocal microscopy for example.

BACKGROUND TO THE INVENTION

An imaging system is described in our co-pending UK Patent Application No. 0324250.0 (published specification no. GB-A-2395265), the contents of which are incorporated herein by reference. This system includes a local master clock which generates a 1 KHz clock signal by which the various parts of the system are synchronised in operation. The system therefore operates at the clock speed irrespective of whether it could operate faster

OBJECT OF THE INVENTION

It is an object of the present invention to provide an image capture system involving a confocal microscope which is not limited to operating at a clock determined speed, but can operate as fast as possible given the limitations of the ancillary equipment, in particular the photodetector (camera).

SUMMARY OF THE INVENTION

In essence it is proposed to allow the co-ordination of at least some of the operations performed by an image capture system to be dictated by the time taken to perform them, rather by reference to a master clock signal.

The present invention provides apparatus for imaging light emitted from a specimen, comprising the following components:
  means for mounting the specimen;
  a light source for illuminating the specimen;
  a scanning system for scanning light from the light source over the specimen and conveying light emitted from the specimen;
  a photodetector for receiving light emitted from the specimen via the scanning system; and
  control means for co-ordinating the operation of the apparatus, and operable to receive a first trigger signal indicating the completion of an operation from one component and transmit a second trigger signal to start an operation by another component in response to the first trigger signal.

In known apparatus, in which all components are controlled by reference to a master clock signal, deadtimes may occur between clock ticks, whilst the system had to wait until all the components were ready for the next operation. In an apparatus embodying the invention, these delays may be substantially eliminated, increasing the speed of operation of the apparatus.

The invention further provides a method of controlling such an apparatus, the method comprising the steps of:
  transmitting a first trigger signal from one component indicating the completion of an operation to the control means; and
  transmitting a second trigger signal from the control means to start another operation by another component in response to the first trigger signal.

Furthermore apparatus according to the invention may include ancilliary components which do not rely on a clock signal for their operation, but are controlled using discrete trigger signals, giving increased flexibility in the selection of the specific peripheral devices to be used to form part of the apparatus. These aspects of the apparatus may be considered to be "self-clocking". Thus, in some embodiments, the apparatus may include some ancilliary components which are self-clocked whilst also including some components which are clock-driven.

One system of the type at which the present invention is directed comprises a computer, a photodetector in the form of a camera, a microscope with Z-position driver, a confocal scanning mechanism, a laser system and a controller, and is described with reference to FIG. 9A in our co-pending Application No. 0324250.0.

In a preferred embodiment, the apparatus includes clock means for generating a clock signal, and light control means for controlling the entry of light into the photodetector, or the incidence of light from the light source on the specimen, wherein the light control means timing is determined by the clock signal. Whilst some components of the apparatus may be controlled using trigger signals, it has been found to be beneficial to control the light control means using a clock signal. Typically, the timing mechanism included in a camera is not sufficiently precise for applications to which the present invention is directed. A clock signal generated by the control means can give better control of the timing and duration of each exposure. The light control means may be in the form of a shutter, or electronic pseudoshutter for example.

In some embodiments, the same clock signal may be used to control the disk rotation rate within the confocal scanning mechanism.

More particularly, the self-clocking technique described above may be combined with clocked components (to form a hybrid system) in which a state table is operated in the manner described in our co-pending Application No. 0324250.0 as part of a state machine under the control of an external clock, but in which the state table is updated at each frame (or set of frames) using a self-clocking mode of operation in which a computer generates a timing or trigger signal as provided herein so that both the original external clock and the self-clocking mechanism are maintained.

An advantage of this hybrid arrangement is that the control of light into the camera can be determined by control of the camera shutter using an external clock, and not by the exposure timing mechanism of the camera.

In one embodiment, the camera is operable to generate a trigger signal after each exposure. Furthermore, the camera may be operable to generate a trigger signal when it is ready for the next exposure. Also, the control means may be operable to transmit a trigger signal to the camera when the apparatus is ready for the next exposure.

Preferably the pixels (photo elements) of the camera (or image sensor) are arranged in pairs, and one of each pair (the active site) is exposed to light, and the other is used as a storage site. At the end of an exposure the electrical charge from the active site of each pair transfers to the storage site of the pair, where it is available for reading out into memory, typically into a buffer memory in the controller of the camera. The active sites are refreshed and are immediately available for a new exposure, during which the storage sites can be read-out and if necessary refreshed ready to receive the next charge transfer from the active sites at the end of the next exposure.

The active and storage sites may be arranged so that charge is transferred on a line-by-line basis (e.g. in an interline camera) or on a frame-by-frame basis in which the data relating to the entire frame is transferred at one go (a frame transfer device).

The camera thus has three modes of operation: (1) exposure, (2) transfer and (3) read-out. The start of each exposure period may be initiated by a trigger or enable pulse. At the end of each exposure, the camera generates an end of exposure trigger (or flag) signal (the A flag) to indicate that another exposure period can be started when the next trigger signal arrives.

At the same time the camera also transfers the pixel charge (image data) to the storage sites, and this transfer can occur very quickly. The camera then commences a read-out from the storage sites on the camera chip into memory. When this activity is complete, the camera generates an end of transfer flag signal (the B flag) to indicate that this data is available for the computer.

Alternatively, generation of the end of exposure flag signal (A) may be delayed until after the transfer has occurred.

The flag signals can be employed to speed up the operation of the system if the time required for movement of the camera relative to a specimen under examination to present another image to the camera, is less than the time required for data transfer and read-out to occur. In this event the only limitation is that the read-out must be completed before the end of the next following exposure period.

In a preferred apparatus for performing the invention, some or all of the controller functions can be carried out by software in the computer, so that the latter now carries out some or all of the tasks previously carried out by the controller, and if all of the functions are performed by the computer, the controller can be dispensed with.

An interface to the camera from the computer or controller may be separate from the outputs to the other devices. Preferably, the confocal scanning mechanism receives a scan clock signal from a scan clock circuit, which is "free-running" and need not be controlled by the computer, with no synchronisation between this clock circuit and any clock signal supplied to the camera. The scan clock circuit is operable to provide clock pulses which are necessary to produce the sequence of commands to the confocal scanning system for the latter to perform the steps required to present an image to the camera.

Other devices such as filter wheels, a microscope controller, additional shutters, XY movement table and a stand-by power control may be connected to the system and driven in the same manner as the other external devices.

Preferably, the control means is operated using software which is implemented as two or more independently executable threads. The trigger or flag signals interact with the software so as to determine the generation of other trigger pulses. To this end the software may use three threads which asynchronously handle the various tasks. In this context a thread is an independent path of execution within the software and in essence comprises a "thread of execution" in that it executes code to accomplish a task linked to the thread. It is of course possible for one thread to communicate and/or co-operate with another thread or threads.

A further hardware device comprising a filter wheel may be added to the system such as is described in our co-pending Application No. 0324250.0.

Two or more systems may be combined to control the self-clocking. For example, the control means may comprise two or more processors, with each thread assigned to one processor.

The trigger or synchronisation of the threads may be performed in hardware (as described above) or in software as a 'callback' routine. A callback is a software routine in which a specified function, referred to as the callback function, is used to transfer information to the main executing program.

In an alternative arrangement the signal required to trigger the camera may be obtained from one or more subsystems (such as an acousto-optic tunable filter (AOTF) of the laser system or the microscope controller, for example).

Thus FIG. 8A of our co-pending Application No. 0324250.0 illustrates an example in which a hardware subsystem can provide a confirmation signal (which can be used as a trigger signal to trigger a camera). The hardware system can be considered to comprise the microscope and Z-position driver or stage drive, the confirmation signal being generated from a movement within the microscope system.

Likewise FIG. 10A of our co-pending Application No. 0324250.0 shows another case, in which an external trigger is used.

Other devices connected to the system may be driven in the same manner as the other external devices, or one or more such devices may be driven by the software directly. In each case, the device will have an operating cycle, and potentially need to be synchronised with other parts of the apparatus.

BRIEF DESCRIPTION OF THE DRAWINGS

Apparatus of the prior art, and embodiments of the invention will now be described by way of example with reference to the accompanying drawings in which.

DESCRIPTION OF THE ILLUSTRATED EMBODIMENTS

The architecture of the system is similar to that illustrated and described in our co-pending Application No. 0324250.0.

Figure 1:
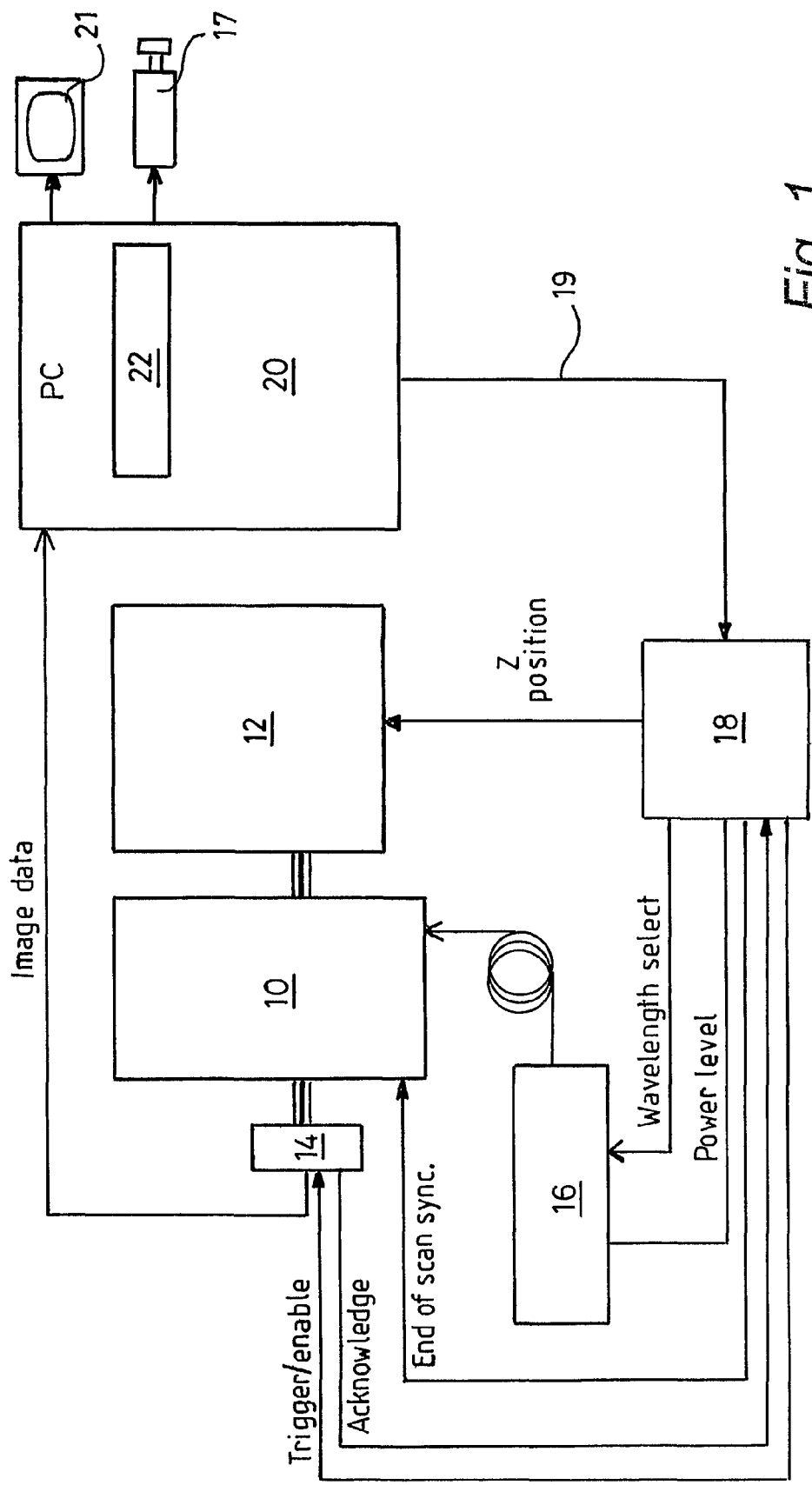
FIG. 1 is a block diagram of a confocal microscope system as shown in FIG. 9A of co-pending Application No. 0324250.0.

FIG. 1 shows a computer 20, display 21, camera 14, microscope with Z-position driver and sample stage 12, confocal scanning mechanism 10, laser system including an acousto-optic tunable filter (AOTF) 16 and controller 18 as are employed in the system of FIG. 9A of our co-pending Application. A projector 17 is also included in FIG. 1.

In operation of the apparatus shown in FIG. 1, controller 18, under the control of computer 20 via line 19, receives the state table to be used for the experiment. Under control from the computer, the execution of the state table is started. The controller sets a height of the microscope 12 above its sample stage for the current state via a "Z position" signal. Controller 18 then sends a "trigger/enable" signal to the camera 14. The controller sends "wavelength select" and "power level" signals to the laser system 16 to set these parameters for the current state. Camera 14 then collects light falling on the sensor. After a predetermined time, the light is switched off. Image data is transferred from camera 14 to computer 20 via the image data line. The process is repeated for the next state.

The controller 18 is also responsible for generating the periodic "end of scan sync" signal. This signal sets the speed of the scanning mechanism in unit 10, such that the light falling on the sensor is from a specific time period equal to that required for scanning the whole of the area of interest n times (where n is a whole number equal to or greater than 1).

Preferably, the signal path 19 between the computer and the controller should be bi-directional in this arrangement to allow communication to co-ordinate distributed threads of software 22 running on the computer 20, as well as transfer of code and data.

Figure 2:
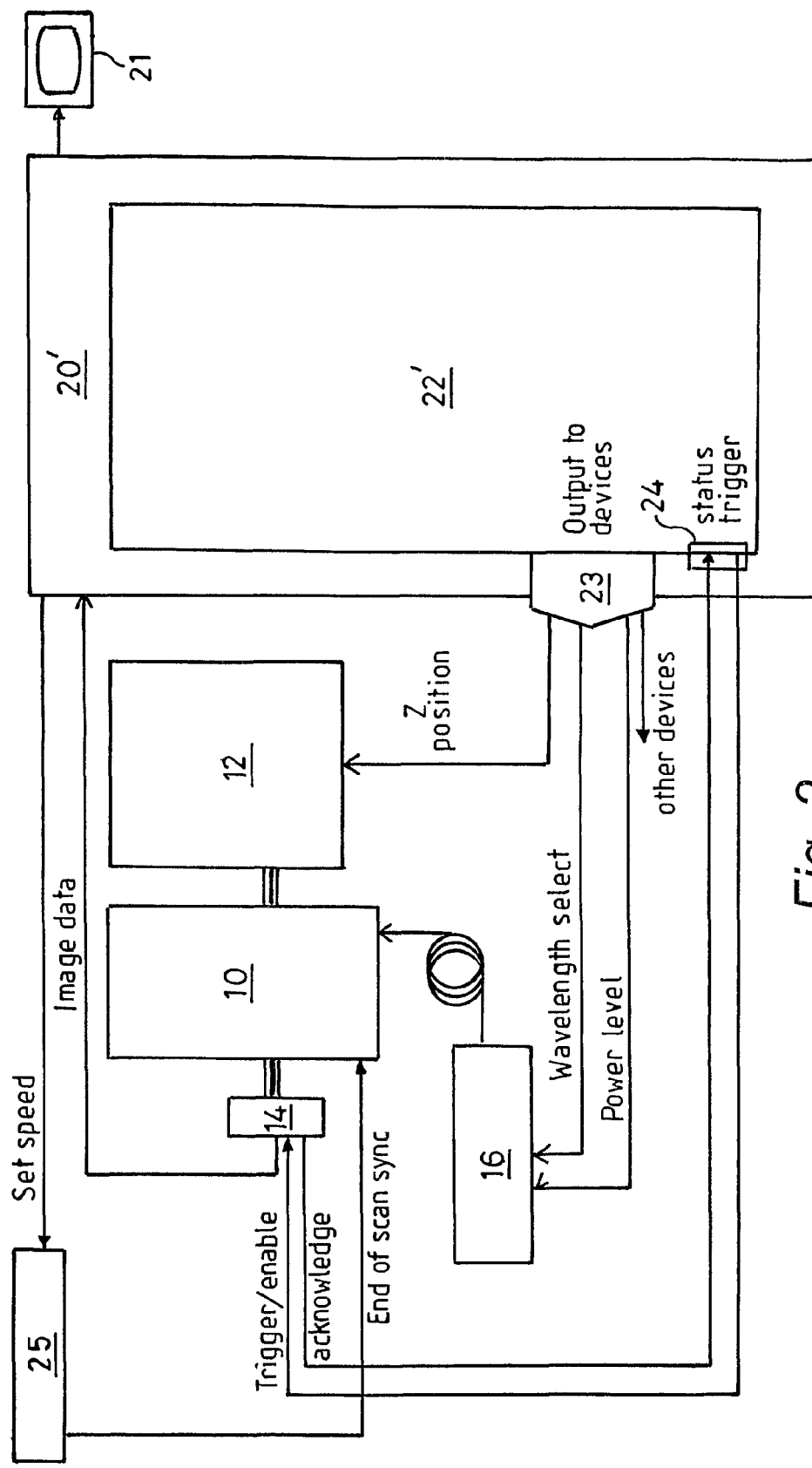
FIG. 2 is a block diagram of an apparatus according to a first embodiment of the invention.

FIG. 2 illustrates an apparatus according to an embodiment of the invention, wherein the controller functions are carried out by software 22' running on the computer 20'. The control lines remain the same but the software 22' in the computer now carries out all the tasks previously carried out by the controller 18 of FIG. 1. This allows all the threads (processes) to run on the same processor, and gives full flexibility to schedule tasks required for imaging.

In this arrangement of FIG. 2, the interface 24 between the computer 20' and the camera 14 is shown separate from the output interface 23 to the other devices (laser system, microscope, etc). The confocal scanning mechanism 10 receives a scan clock signal from a scan clock unit 25. This may be controlled by the computer 20' to set the appropriate speed via the line marked "set speed" in FIG. 2, or it may be independent thereof. There is no synchronisation between clock unit 25 and the clocking of the camera 14 by the computer 20'.

Although not shown, it will be appreciated that other devices may be connected to the system and driven in the same manner as the external devices illustrated in FIG. 2. These may include filter wheels, microscope control, additional shutters, XY movement table and stand-by power control, for example.

In a preferred embodiment of the system, the camera 14 is a so-called charge transfer CCD camera in which the image sensor pixels (photo elements) are arranged in pairs, and during an exposure only one of each pair (the active site) is exposed to light. When the exposure is complete the electrical charge from each active site is transferred to the other site of the pair (its partner storage site) and the active site refreshed ready to receive a new exposure. The transferred charge stored in the storage site is available for reading out, and all the partner sites are read out (and refreshed if necessary) before the next charge transfer is to occur.

Each exposure thus comprises three steps: (1) exposure to light, (2) charge transfer and refresh, and (3) read-out. These will be described in more detail with reference to FIG. 3.

The start of the exposure may be initiated by a trigger (or enable) pulse 27 (FIG. 1 and FIG. 2). At the end of the exposure period 29 the camera transfers the pixel charge pattern to the storage sites and refreshes the active sites. This step can be performed very quickly.

Either at the end of the exposure (as shown) or at the end of the charge transfer period 31, the camera makes available a signal (the A flag) 33 to indicate that it is ready for another exposure and will accept a trigger signal.

In relation to the true software synchronizer, the term "trigger" can either mean a software generated trigger, whereas in the hybrid case the term means running the synchronizer with the primed states using the external trigger to start and stop the AOTF, the camera and the Z-stage. In the former case, the software trigger may come as part of the package as when a Hamamatsu SDK system is employed for example.

After transfer is complete, the camera commences a read-out of the stored charge pattern from the storage sites into a buffer memory in the camera controller during read-out period 35. When this is complete the camera sends a signal (the B flag) 37 to indicate that this data is available for the computer to read and process.

Figure 3:
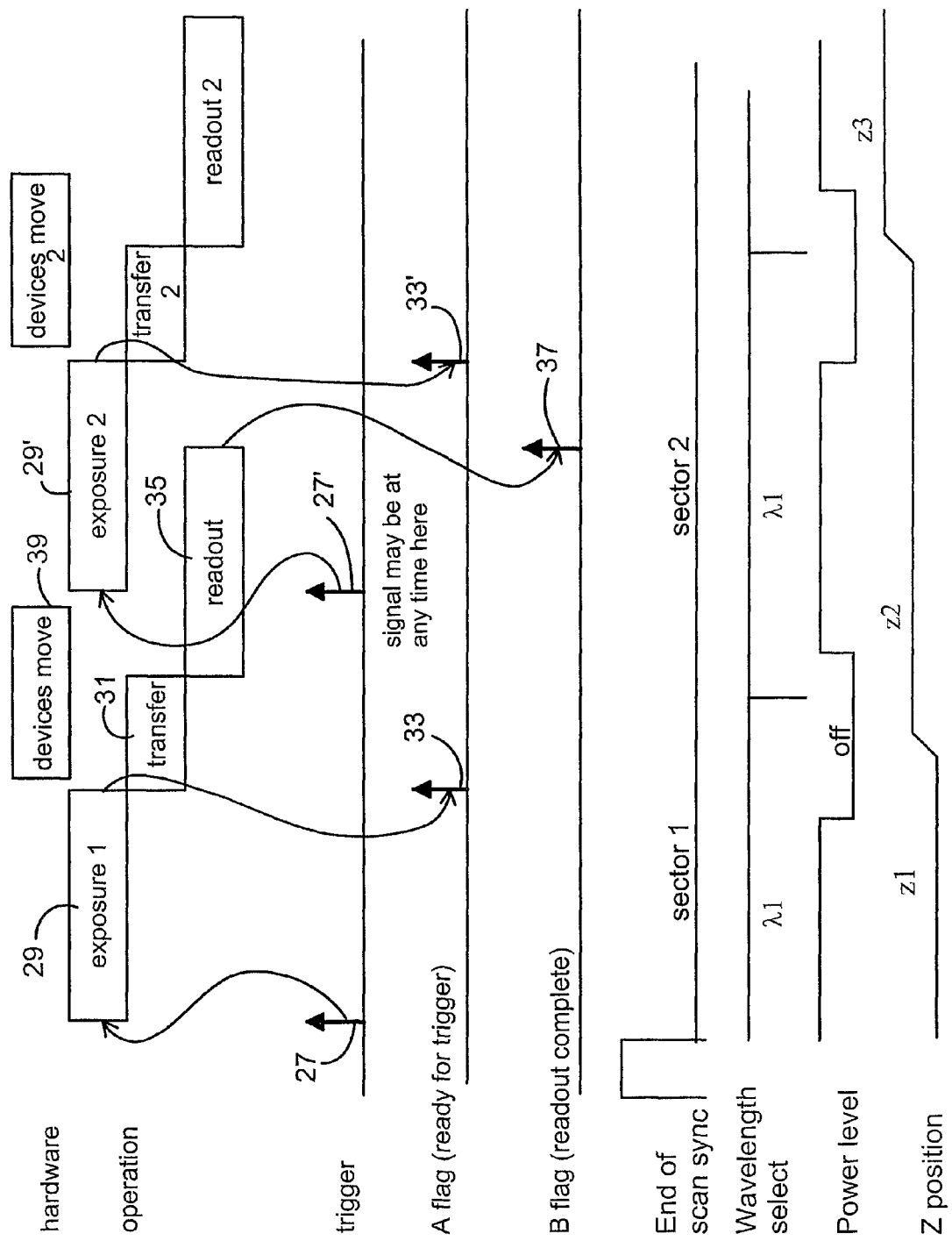
FIG. 3 is a timing diagram showing when different signals/flags arise during operation of a self-clocking system according to an embodiment of the present invention.

The next trigger (or enable) pulse 27', which can occur any time after transfer 31 has completed, is shown on the trigger time-line in FIG. 3 and the next A flag 33' is shown at the end of the second exposure period 29' on the A flag time-line.

The time during which the devices associated with the imaging system can move to present a different area of a specimen to the scanning system is denoted by box 39 and the timing of the second trigger pulse 27' is determined by the end of the movement period 39. Preferably, it occurs immediately after the end of movement period 39.

Figure 4:
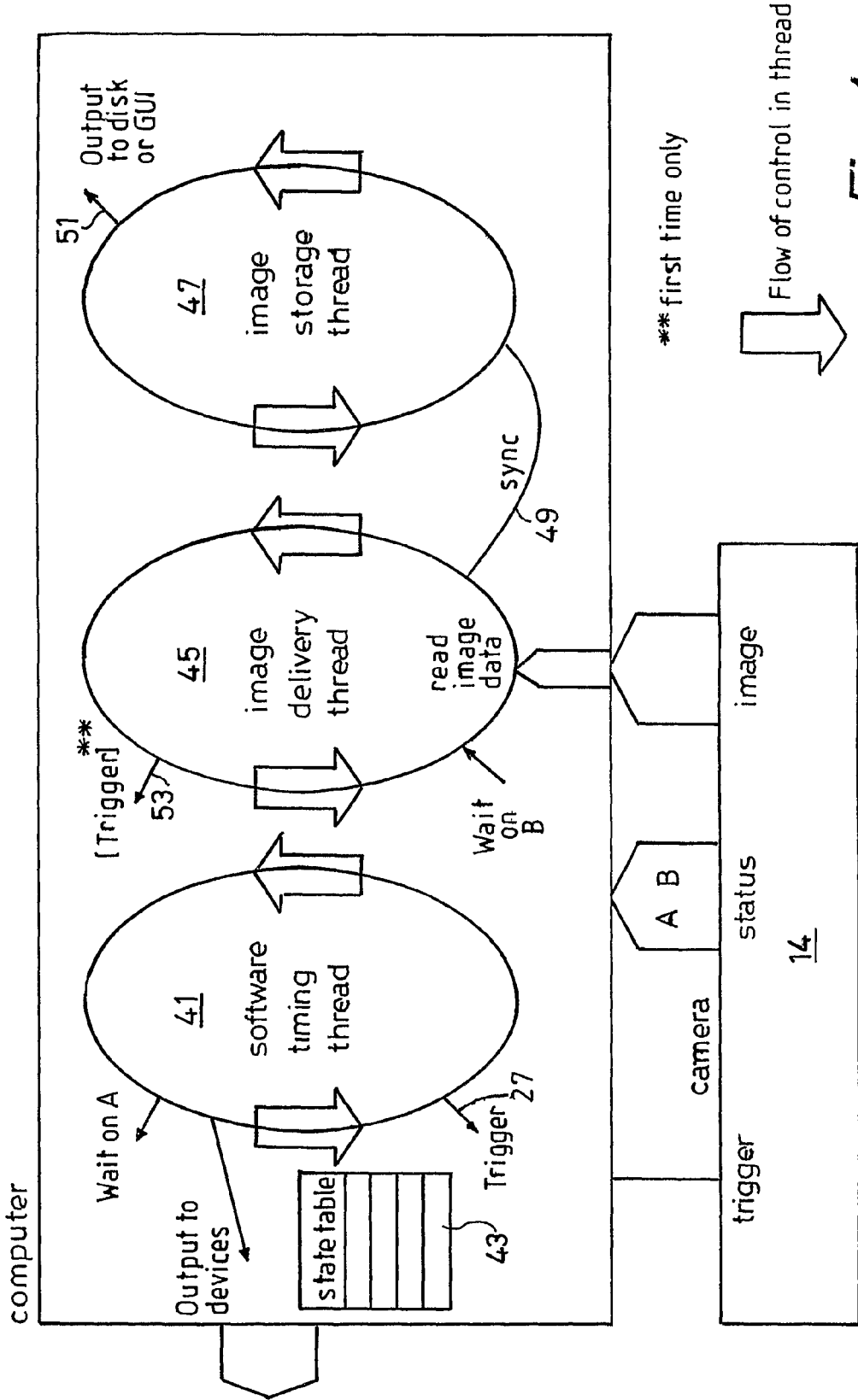
FIG. 4 illustrates a suitable architecture for software to run on the computer of FIG. 2.

FIG. 4 schematically shows the software architecture. This uses three threads which asynchronously handle the various tasks.

A software timing thread 41 deals with control of exposure and external devices (microscope, laser system, camera exposure time etc).

The software timing thread (the first thread) deals with control of exposure and the external devices (microscope, laser system, camera exposure time etc). It uses a state table 43 (equivalent to the state memory 62 in our co-pending Application but without the state duration field, as this function is now undertaken by the self-clocking mechanism), which holds the settings of the various external devices. In addition the software timing thread waits until an A flag 33 is active before it takes the next entry in the state table 43, and uses this information to set the external devices. Once this is complete, the software timing thread sends a trigger signal 27 to the camera to start the exposure period 29. The software timing thread then goes back to waiting for the A flag 33 to become active again.

The A flag 33 may be polled by the first thread or drive an interrupt which sends a signal to the first thread.

The setting of the external devices may involve additional trigger/wait cycles.

The second thread 45 is an image delivery thread. This thread waits for the B flag 37 to become active whereupon it reads the data which has been read out from the camera into a memory device in the camera controller (or computer 20' (of FIG. 2)) into the computer (directly, or indirectly by supervising a transfer carried out in hardware). At this stage it signals to the third thread, image storage thread 47, that the image data is available (sending the data, or the address of the data). It then goes back to waiting for a B flag.

The third thread 47 waits for a sync signal 49 from the image delivery thread 45 and on receipt thereof transfers the image data to a hard disk or to a user interface such as a graphical user interface (or GUI), as shown by arrow 51.

In this way the different parts of the system wait for a previous action to be completed before moving on to the next step, and the system is termed "self-clocking" since the camera provides a signal (A and/or B) which indicates that it is ready for the next operation. The software waits for this signal before sending a trigger signal, which in turn gives rise to the change in the A/B signals. The system thus has two timing elements, namely flag A and flag B.

FIG. 4 also shows how on initialisation a first trigger signal 53 to prime the camera is provided by the image delivery thread or may be input by a user.

The system may have one or more image storage threads to pass image data to disk, graphical user interface (GUI) and other subsystems; and/or the system may have more than one camera; and/or the system may have more than one image delivery thread and more than one software timing thread to collect data from the camera or cameras.

Where the controller of FIG. 1 includes a computer one or more threads of software such as FIG. 4 may be run as processes in the controller.

Alternatively software based on the FIG. 4 model may be run wholly within the computer of FIG. 2 thereby obviating the need for a controller.

Figure 5:
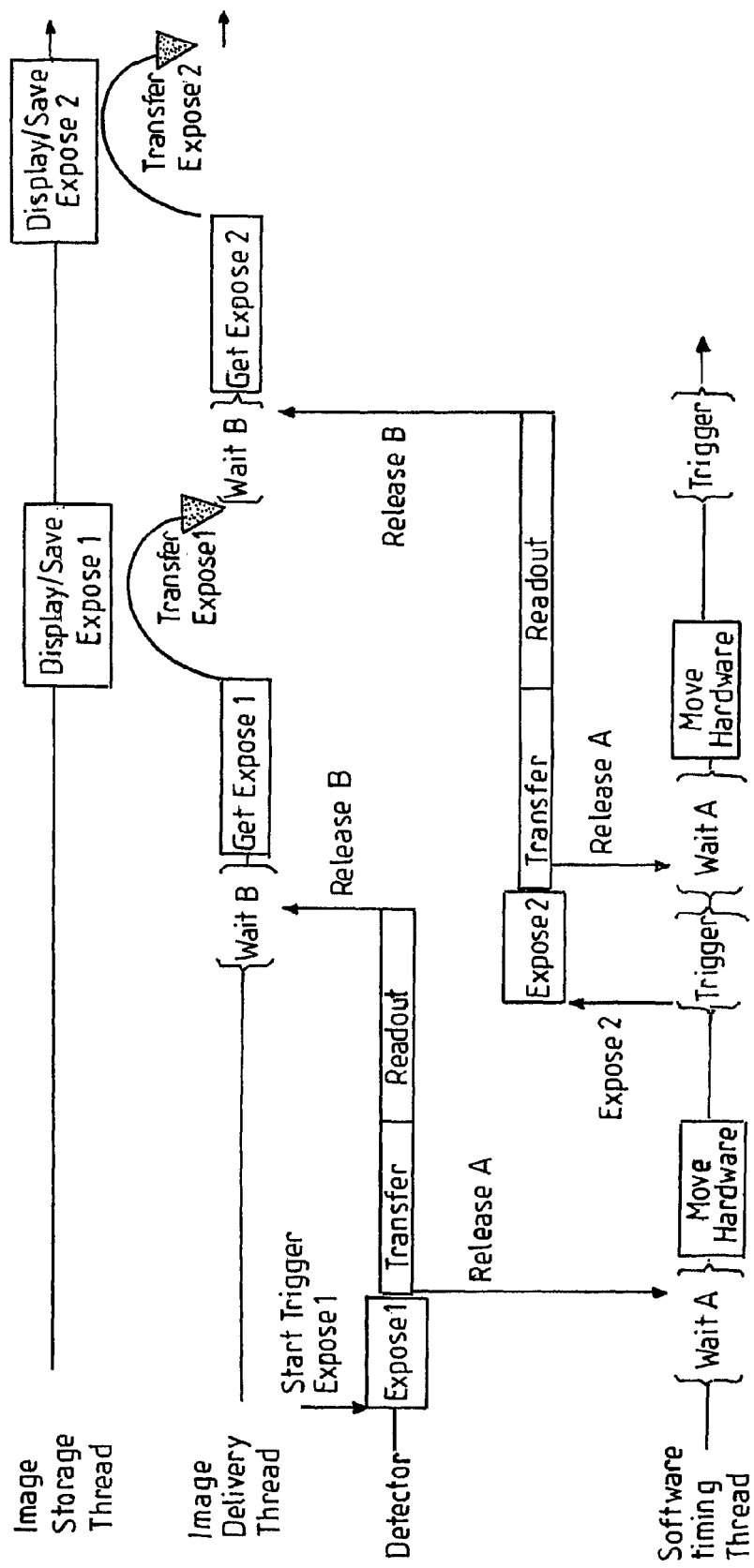
FIG. 5 illustrates the operation of the software threads of FIG. 4 in more detail.
Figure 6:
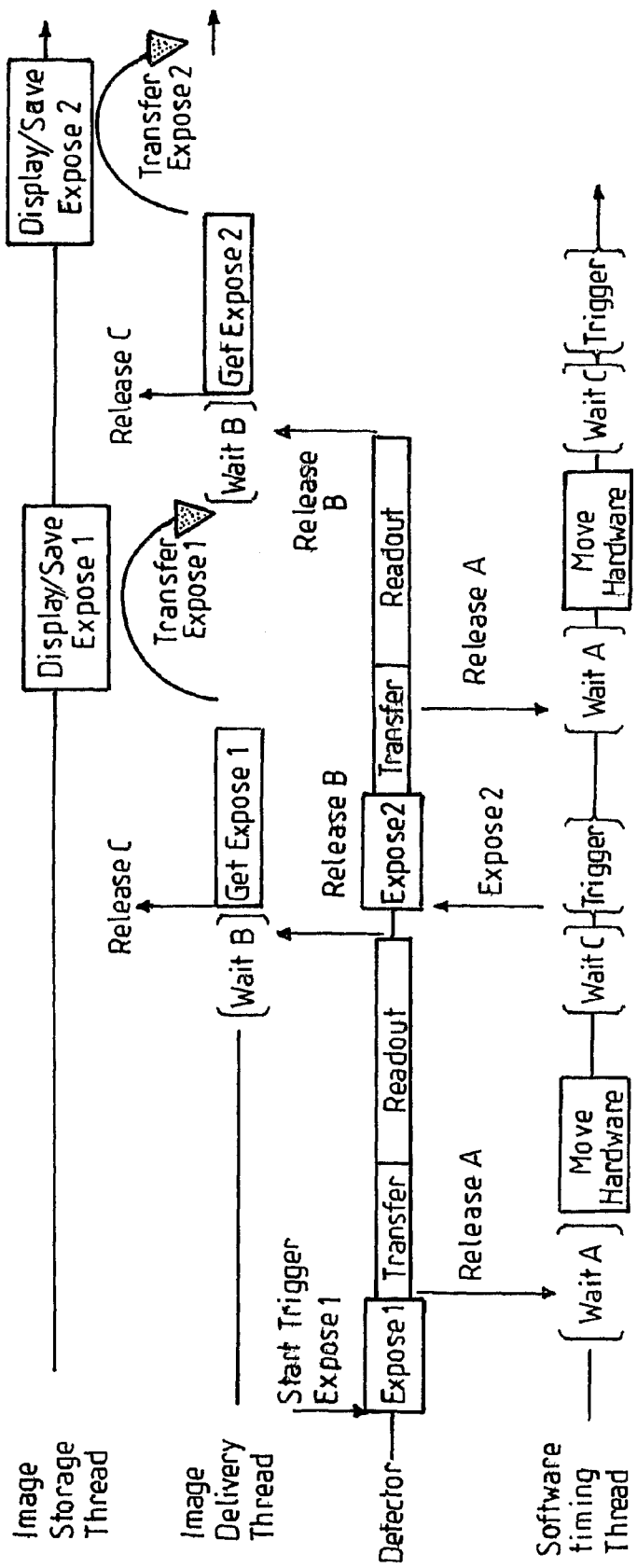
FIG. 6 shows how an additional delay ("Wait C") can be introduced to make sure the hardware is in the correct position before a trigger is fired.

Although Wait A and Wait B are included in both FIGS. 5 and 6, no "Wait C" is incorporated into the embodiment of FIG. 5 but it is included in FIG. 6. The Wait C will usually be required to take into account time delays in the system hardware. This ensures the trigger is only fired to start the next exposure at a time when the camera can respond.

FIGS. 6 to 10 illustrate variations in the positioning of trigger (release) signals according to respective embodiments of the invention. In FIG. 6, the "release C" flag is used to guarantee that the next exposure is not started until the previous one is complete e.g. a mixture of very short and very long exposure time.

Figure 7:
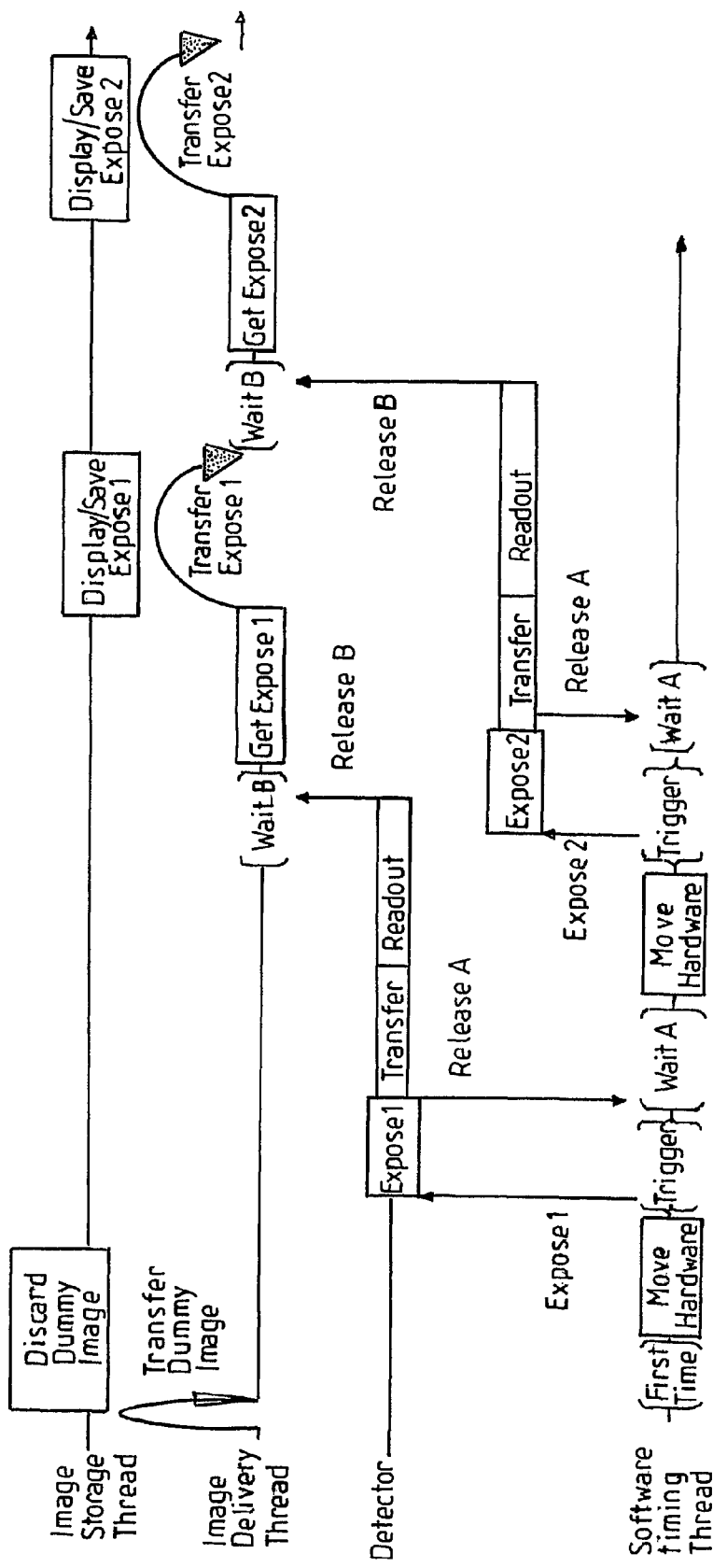
FIG. 7 is a variant of FIG. 5 in which the Image Delivery Thread is modified to avoid the wait for B signal on its first operation, and the Software Timing Thread is modified to avoid the wait for A signal on its first operation.

In FIG. 7, the start trigger is eliminated. The threads are initialised using a dummy transfer. The callback routine is passed a blank image or an indicator for an image, which indicates that all the threads have started correctly. In addition, a 'first time' flag is set within the software timing thread, to avoid the Wait A. The advantage of this is that the system does not have to rely on an external hardware device to start up, and can instead be primed in software. If there is a hardware failure, this can be reported.

Figure 8:
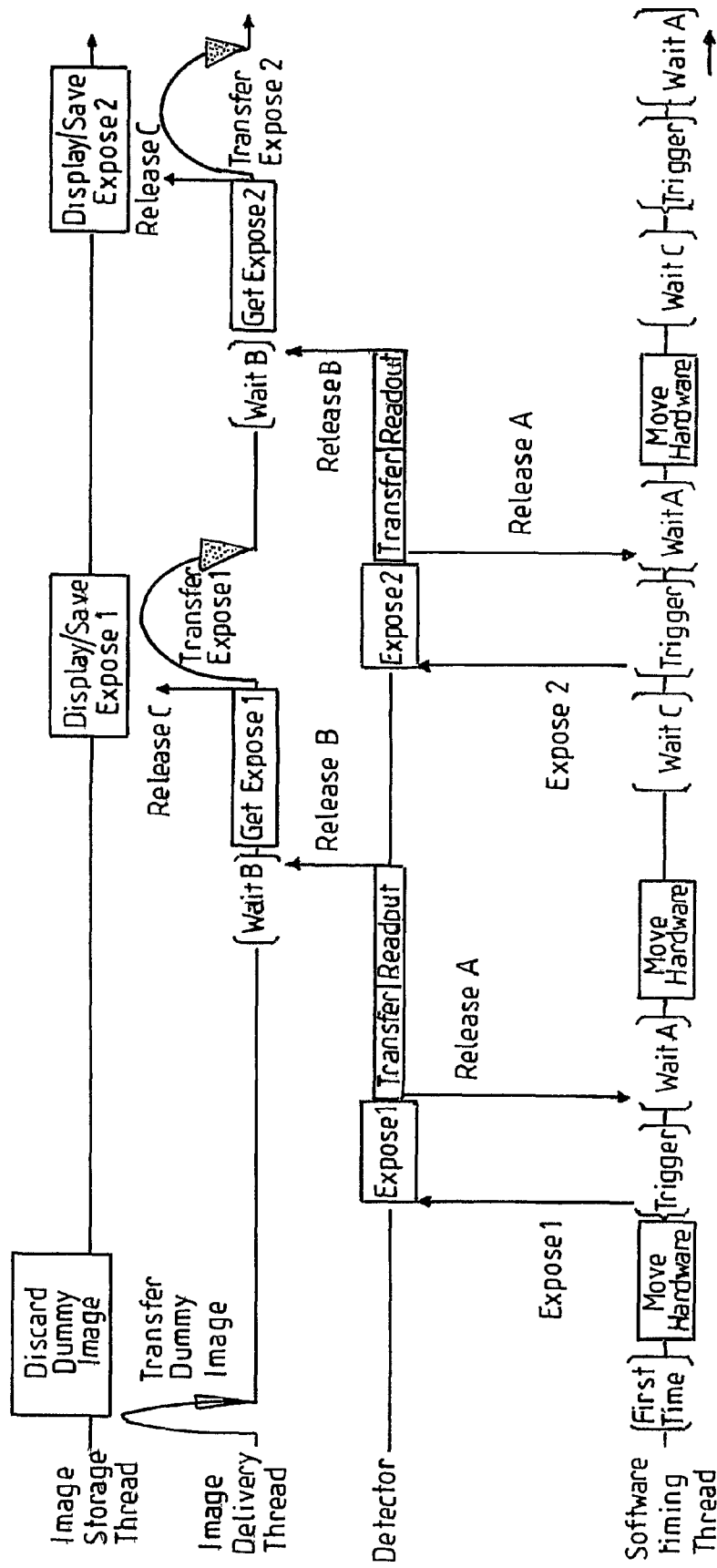
FIG. 8 is a variant of FIG. 6 in which the Image Delivery Thread is modified to avoid the wait for B signal on its first operation, and the Software Timing Thread is modified to avoid the wait for A signal on its first operation.

FIG. 8 is based on FIG. 7 (with the dummy transfer and the first time flag). It also uses the 'release C' as employed in FIG. 6, albeit in a different place: between 'get exposure' and 'transfer'.

Figure 9:
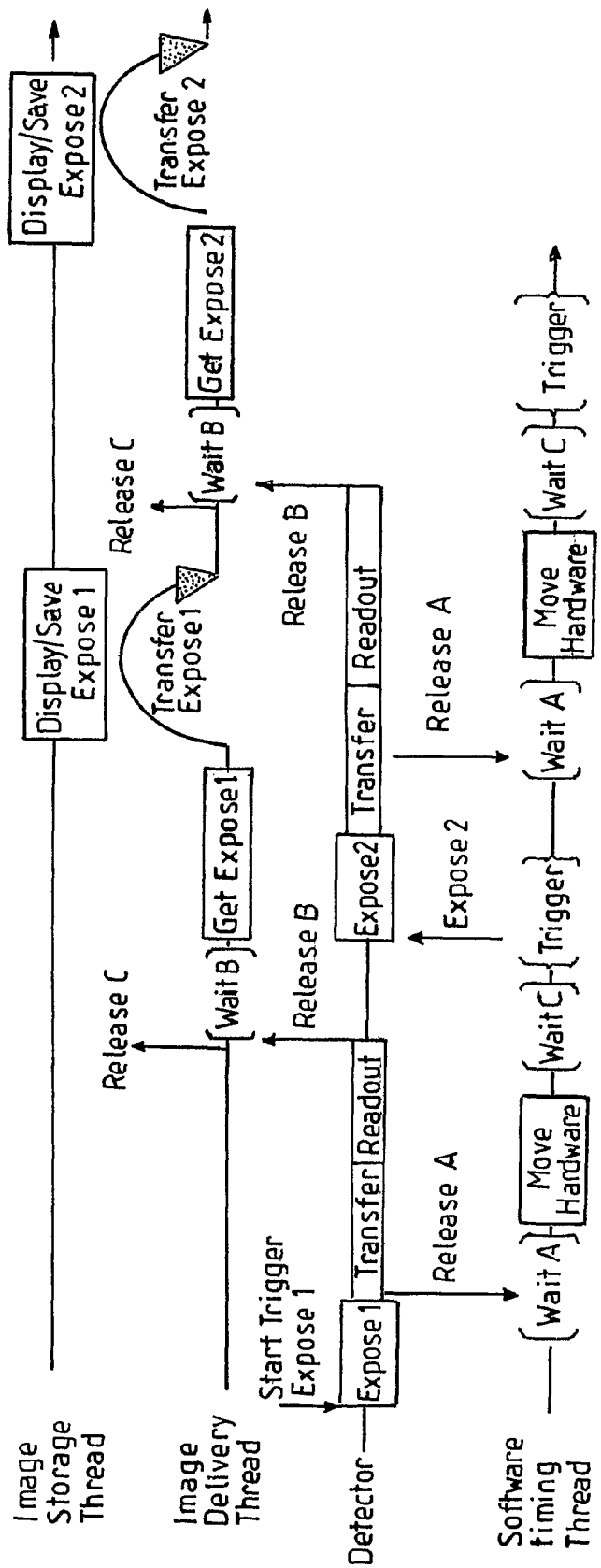
FIG. 9 is a variant of FIG. 6 in which the release C signal of the Image Delivery Thread is shifted to be set before the Wait B.

FIG. 9 is similar to FIG. 6, but places the 'release C' in an alternative possible position, before 'wait B'.

Figure 10:
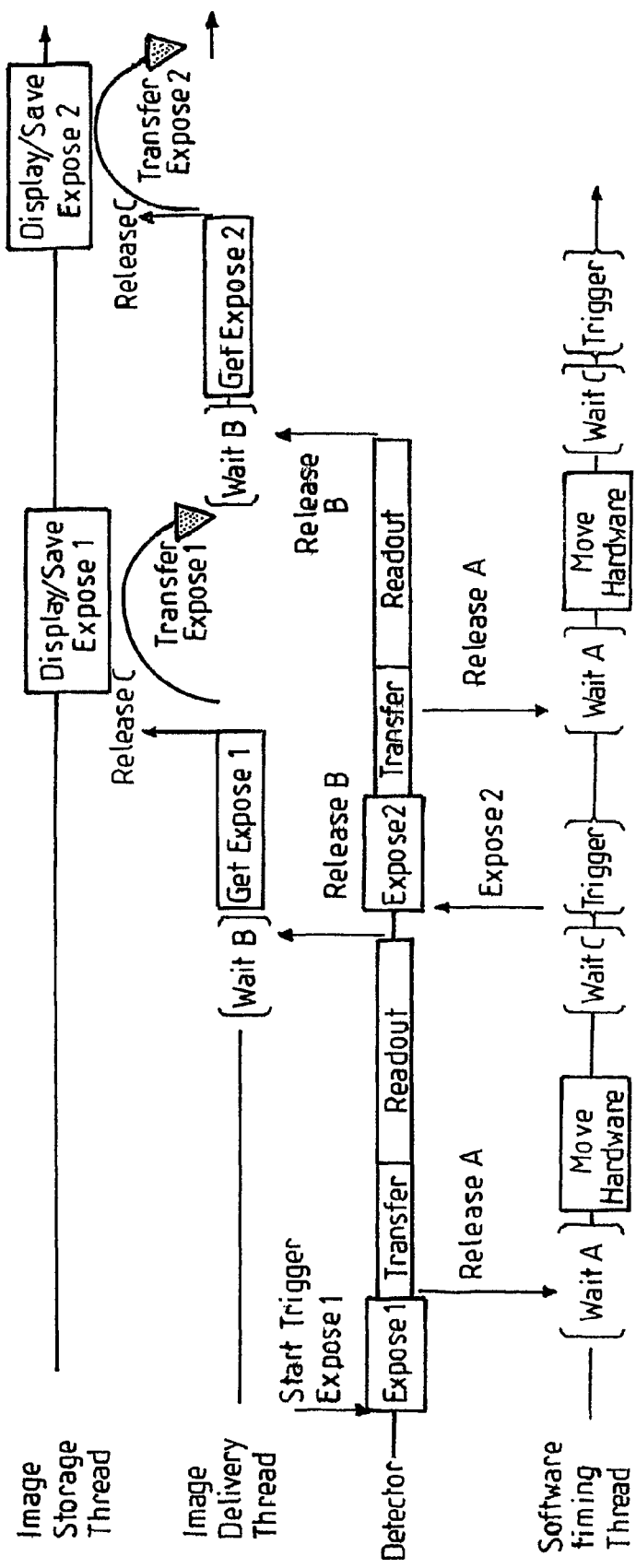
FIG. 10 is a variant of FIG. 6 in which the release C signal of the Image Delivery Thread is shifted to be set after the "get expose" operation.

FIG. 10 similar to FIG. 9, with 'release C' in the same position as shown in FIG. 8.

It will be appreciated from FIG. 6 to 10 that the 'release C' may be placed in various positions, so long as it is sent after the "Wait C" in the software timing thread, and irrespective of whether the start trigger is omitted in the manner shown in FIG. 8, with FIG. 8 showing the preferred option.

Additional waits (e.g. Wait D, Wait E etc), may be required to take into account further delays which may not be sufficiently catered for by the single Wait C, and which arise from FRAP ("fluorescence recovery after photobleaching") or any other existing time delays present in the original system hardware such as is described in our earlier UK Patent Application 0324250.0.

FIG. 8A of our co-pending Application shows the case where the microscope (Z-positioner or stage motion) is the subsystem providing the confirmation signal—which is derived from the movement and can be used as the trigger signal in the present invention for the next exposure. FIG. 10A thereof shows how an external trigger is used. To achieve self-clocking, the trigger signal may be obtained from one or more of the hardware subsystems such as the AOTF system or the microscope control.

Figure 11:
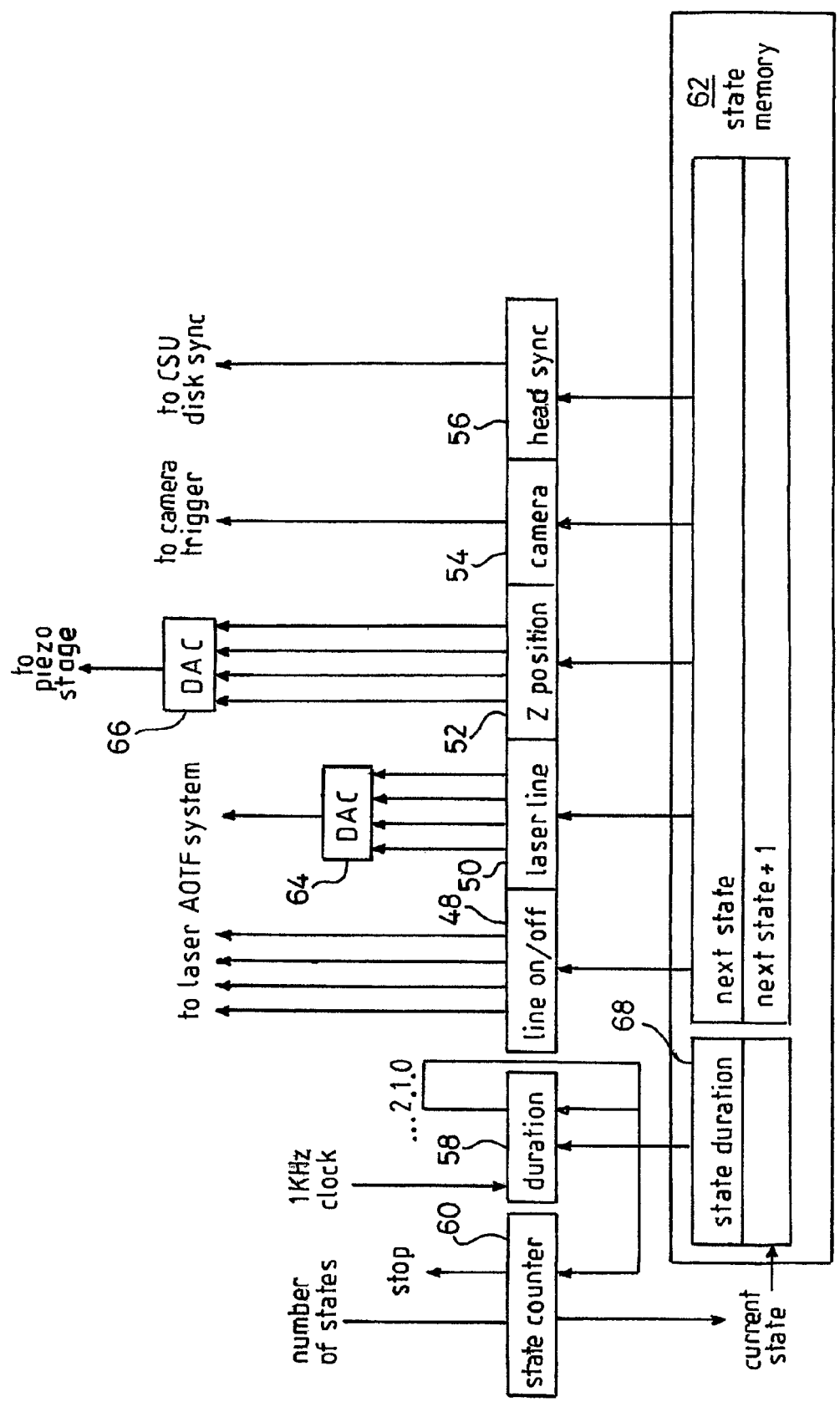
FIG. 11 is a block diagram of a hybrid system based on FIG. 4 of pending UK Application 0324250.0 in which the state table responds to an external clock but is updated in response to the end of each frame (or set of frames)

An alternative embodiment of the invention comprises a hybrid of the self-clocking principles of the present invention and the wholly externally clocked system described in our co-pending Application. FIG. 11 corresponds to FIG. 9B of the earlier Application, in which the State Table is operated as before as part of a state machine with its own clock. However, in an embodiment of the present invention the State Table is updated, that is, moved to the next state, at each frame (exposure) or set of frames, using software such as shown in FIG. 4. In this way both the original external clock, and the self-clocking mechanism are utilised, and the control of light to the camera is determined by control of the excitation light and the external clock, and not by the exposure timing mechanism of the camera.

Figure 12:
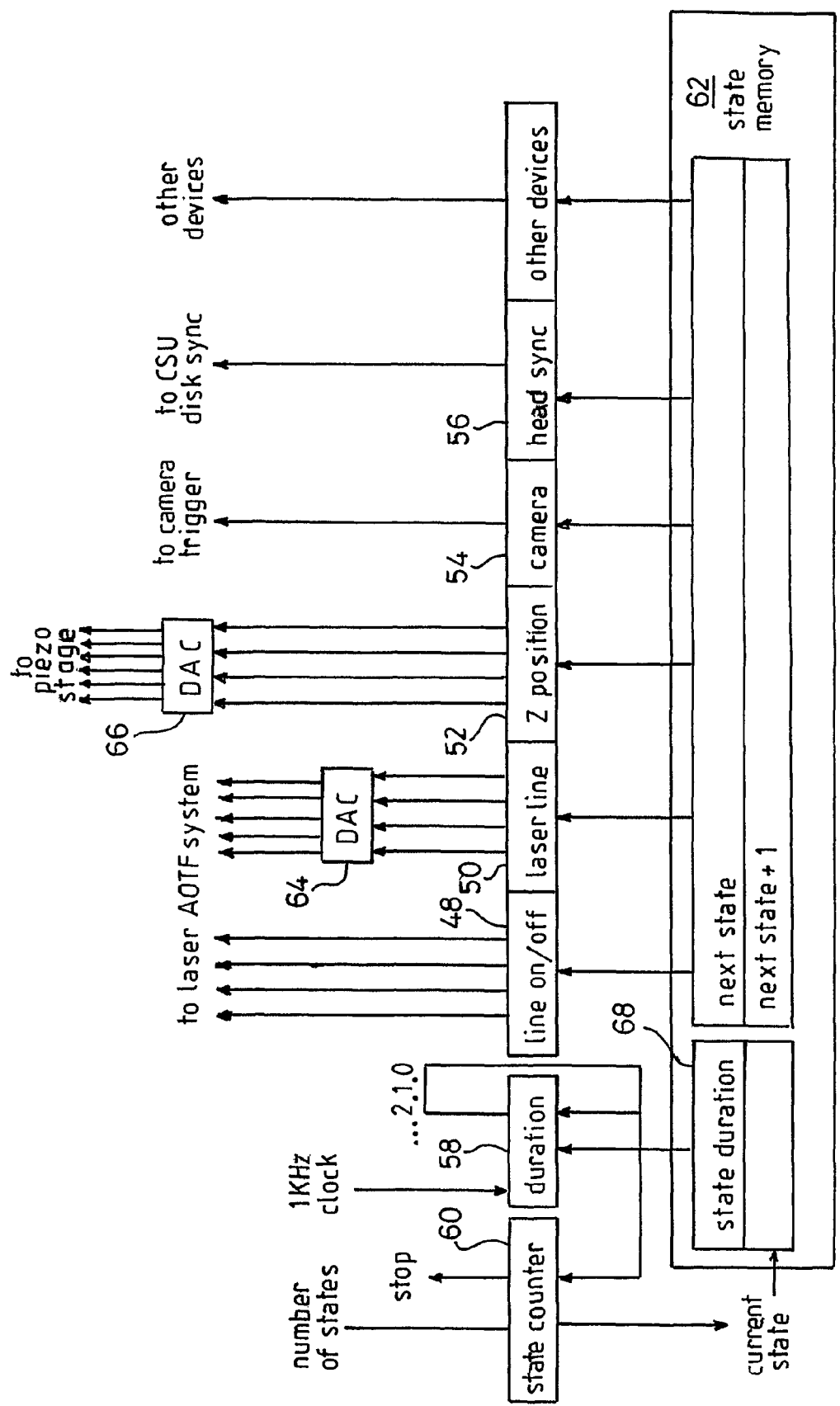
FIG. 12 shows an example of how other devices can be connected to the system of FIG. 5.

As shown in FIG. 12 other devices may be connected to the system of FIG. 11 and driven in the same manner.

Figure 13:
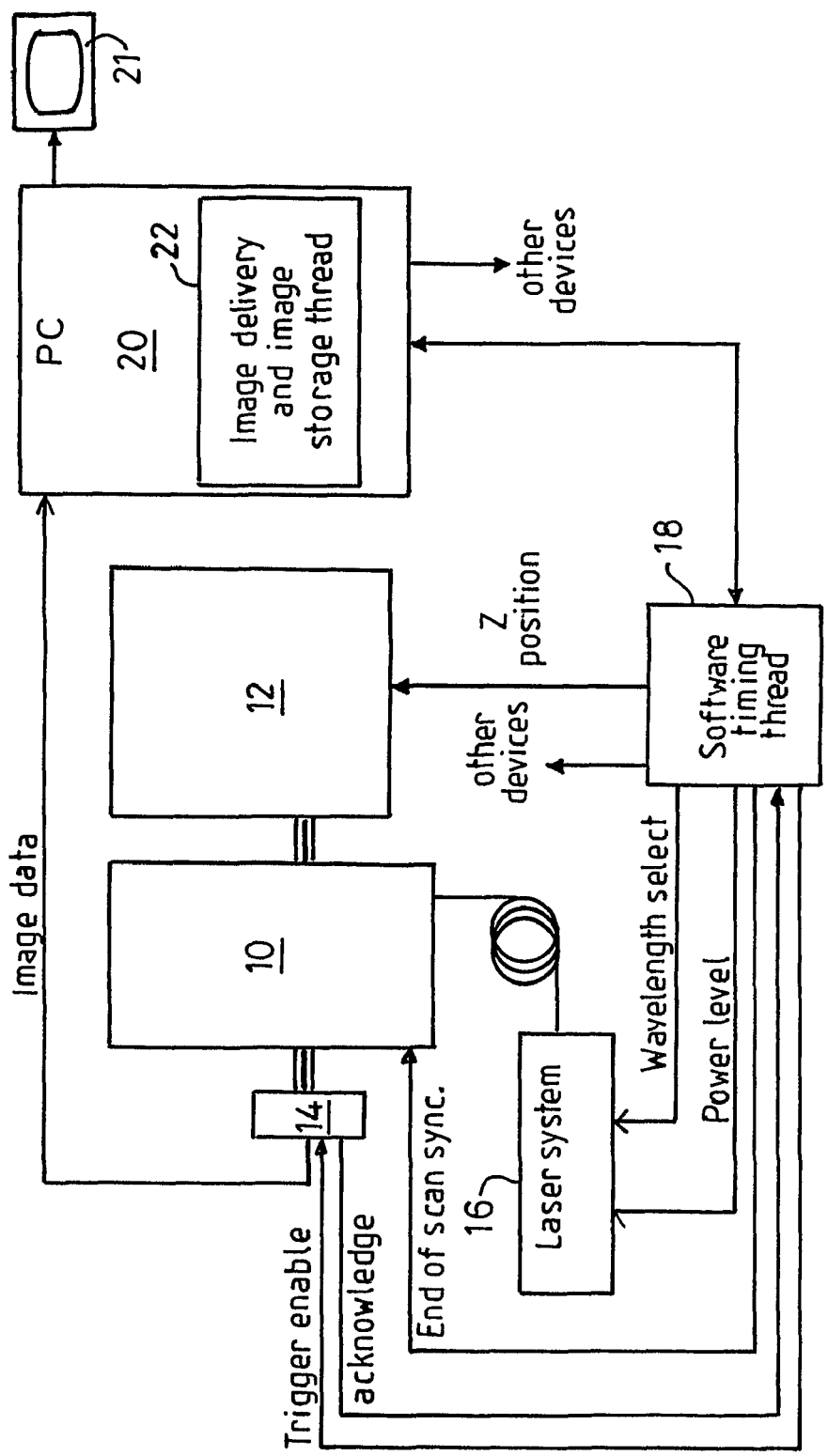
FIG. 13 is a generalisation of FIG. 1 and shows how one or more of the other devices is under direct control of the computer and therefore controlled by the software running on the computer.

One or more of these other devices may be driven by software such as shown in FIG. 4 running on a controller 18 as shown in FIG. 13 or wholly in a computer, as depicted in FIG. 2. In the embodiment shown in FIG. 13, one of the software threads, the "software timing thread" referred to above is executed by the controller 18, and co-operates with the software running on the computer 20.

The invention claimed is:

1. Apparatus for imaging light from a specimen, comprising the following components:
    a microscope including a mounting arrangement for mounting the specimen;
    a light source for illuminating the specimen;
    a scanning system for scanning light from the light source over the specimen and conveying light from the specimen;
    a photodetector for exposure to light from the specimen via the scanning system and microscope to capture an image of an area of the specimen; and
    a control arrangement for co-ordinating operation of the apparatus, wherein the photodetector is operable to generate a first trigger signal after each exposure and send it to the control arrangement, and the control arrangement is operable to transmit a second trigger signal to the photodetector in response to the first trigger signal when the apparatus is ready for the next exposure.

2. Apparatus of claim 1 including a clock for generating a clock signal, and a light control arrangement for controlling the entry of light into the photodetector or the incidence of light from the light source onto the specimen, wherein the light control arrangement timing is determined by the clock signal.

3. Apparatus of claim 2 wherein the scanning system is arranged to receive said clock signal.

4. Apparatus of claim 1 wherein the scanning system is arranged to receive a scan clock signal from a scan clock arrangement, the remainder of the apparatus being operable independently of the scan clock signal.

5. Apparatus of claim 1 wherein the photodetector is operable to transmit a third trigger signal when ready for the next exposure.

6. Apparatus of claim 1 wherein the control arrangement is operated using software, the software being implemented as two or more independently executable threads.

7. Apparatus of claim 6 wherein the control arrangement comprises two or more processors, with each thread assigned to one processor.

8. A method of controlling an apparatus for imaging light from a specimen, the apparatus comprising the following components:

a microscope including a mounting arrangement for mounting the specimen;

a light source for illuminating the specimen;

a scanning system for scanning light from the light source over the specimen and conveying light from the specimen;

a photodetector for exposure to light from the specimen via the scanning system and microscope to capture an image of an area of the specimen; and a control arrangement for co-ordinating operation of the apparatus, the method comprising the steps of:

transmitting a first trigger signal from the photodetector after each exposure to the control arrangement; and transmitting a second trigger signal from the control arrangement to the photodetector in response to the first trigger signal when the apparatus is ready for the next exposure.

\* \* \* \* \*